Patented Feb. 21, 1928.

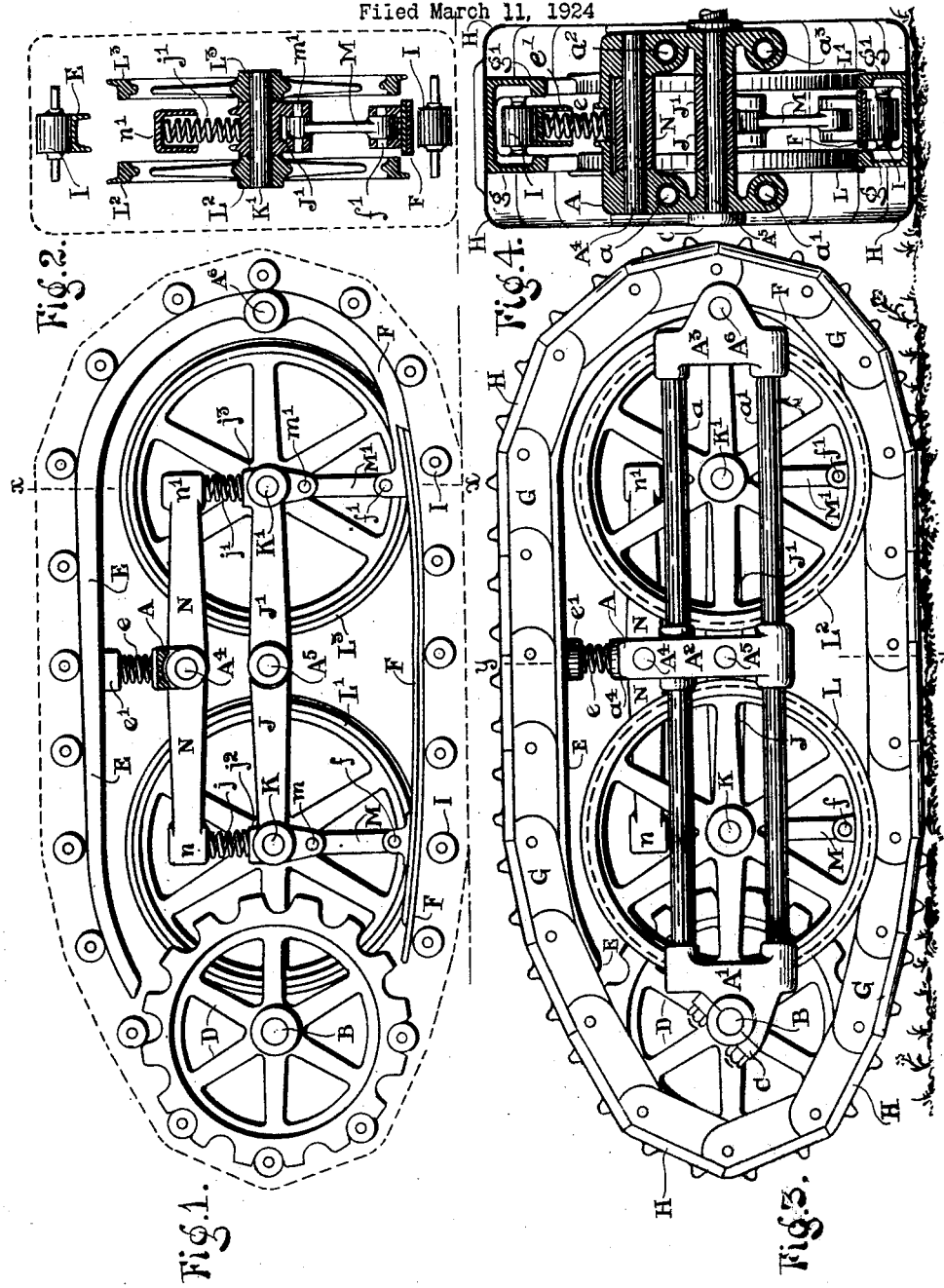

1,660,104

UNITED STATES PATENT OFFICE.

WILLIAM H. SMYTH, OF BERKELEY, CALIFORNIA.

FAST-SPEED TRACTOR.

Application filed March 11, 1924. Serial No. 698,437.

This invention relates to vehicles for load bearing and motor service. It has for its main object to provide a wheel-assembly for vehicles that will permit of faster speed than is practicable under present practice and construction in the track-layer form of tractors, and, incidental to the main purpose, to provide in a vehicle of the track-layer type, a chain-track-assembly with an irreducible minimum of load-bearing rotative parts without diminution of effective ground contact or wheel-base, but a substantial reduction of over-all length of chain-track-assembly, and by these and other means to effect a corresponding reduction of weight, cost, wear-and-tear and upkeep expense, with simplification of construction and ease of replacing worn parts.

A typical expression of my invention, that accomplishes these objects is illustrated in the accompanying drawing, wherein:

Fig. 1 shows a side elevation of those parts of a tractor most directly affected by my invention;

Fig. 2 shows a section of Fig. 1 on the line of $x$—$x$;

Fig. 3 shows a side elevation of the wheel-assembly with the track-layer chain-track in place;

Fig. 4 shows a section of Fig. 3 on the line of $y$—$y$.

In the track-layer tractor art, heretofore, two lines of inventive development have been followed, resulting in two types of devices. In one the track is stationary with reference to the framework; in the other it travels with and is part of the chain, as an endless chain-track.

Both of these types are erroneously constructed, showing failure to realize that a track-layer tractor is essentially a traveling cog-railway that lays its cogged-track as it progresses. Thus, in the first or roller-chain type, the load-bearing wheels, being journaled on the endless chain, must of practical necessity, be small in diameter. They are, in practice, mere antifriction rollers. And by the small diameter of these chain-carried rollers, their rotative speed must necessarily be high compared to the speed of advance of the whole machine, and doubly so in the upper reach of the chain. Also this form inherently involves great multiplication of rotative and friction generating parts with corresponding difficulty of lubrication.

The second or chain-track type while avoiding some of the troubles of the first, has inherent limitations, made apparent in the slow speed, the heavy upkeep expense, and the characterizing construction of the now familiar tracklayer tractor.

A cogged-railway, laying its own track as it advances, involves two distinct functions which must be equally provided for in order to realize an efficient machine: laying a smooth track, and bearing the weight of the motor element and other load.

Each of the types mentioned is based upon and provides effectively for only one of these functions; thus introducing a different law of operation in two machines designed to accomplish the same purpose.

In the first type, a smooth continuous track is provided at the cost of the load bearing function. This is seen in the necessarily small diameter of the chain-carried rollers.

In the second type the load-bearing function is provided for by the relatively large truck-wheels stationary with reference to the frame, but at the expense of the track function. The track is necessarily rough as it buckles between the peripheries of the load-bearing wheels; also it vibrates excessively in the upper (fast traveling) stretch, except at slow speed of advance.

I deem the foregoing necessary to a proper understanding of the present invention in which the track-laying function and the load-bearing function are independently provided for without compromise or loss to each other; and in which the construction partakes more of the "round-wheeler" construction than of that of the customary tracklayer tractor. And thus I am enabled to provide a fast-speed tractor that embodies and combines the tractive capability of the cogged-railway with the speed capability and other advantages of the automobile and track locomotive.

As the wheel-assembly alone distinguishes the tracklaying type from the "round-wheeler" form of vehicle, the motor element and its framewrok being common to both types, and the construction of these parts being within the knowledge of mechanics skilled in the art, I will confine my description to those parts of the complete structure directly affected by my invention. But, in what follows, it is to be understood that the power-wheel with its journal-boxes and frame herein shown and described, are intended to represent not alone a power-wheel and wheel-assembly frame, but also, for the purpose of this disclosure, the motor-element complete with suitable rigid, flexible, or resilient connection between the power-element-frame and, the wheel-assembly that is described and illustrated herein. And further, that a similar wheel-assembly is or may be, on the opposite side of the motor- or main-frame of the completed machine.

With this understanding, A, represents framework pertaining to a vehicle. In the present expression of my invention it is preferably constructed of longitudinal bars or tubes $a$—$a^1$—$a^2$—$a^3$, upon which is heat-shrunk or otherwise secured brackets $A^1$—$A^2$—$A^3$, the side members of frame A, being securely tied together by heavy brace-rods $A^4$—$A^5$—$A^6$, in substantially the same horizontal plane as the power-wheel shaft. The frame A, carries journal-box C, and shaft B, journaled therein. Upon the shaft B, is secured power-wheel D, with its circumferential teeth or sprockets. Upon the brace-rod $A^6$, is hinged a curved upper guide-rail E, and also a curved lower guide-rail F. The guide-rails E and F, extend rearwardly from their hinge connection toward and close to the power-wheel D, like the hinged members of a caliper about to caliper the power-wheel. The guide-rails E and F, thus constitute with the power-wheel D, an oval substantially continuous guide-way.

Trained around the guide-way is an endless track-chain G. It is preferably formed of parallel links $g$—$g^1$, constituting an endless, double-track rail or twin-track. The rail is provided with laterally extended tread-shoes H, adapted to afford a wide ground-bearing support for the machine. On the links of the chain G, intermediate of its track surface and its ground-contact-surface are journaled antifriction rollers I, adapted to roll upon the guide-rail E—F, and coact with the power-wheel D, to form abutments therefor.

Pivoted on the brace-rod $A^5$, is a journal-arm J, extending rearwardly, and upon its rearward end is journaled a shaft K of twin-wheels L—$L^1$, travelable upon the twin-tracks $g$—$g^1$. Pivoted upon the same shaft is a similar journal-arm $J^1$, extending forwardly, similarly provided as is J, with a shaft $K^1$, and twin wheels $L^2$—$L^3$. This pair of unit-twin-wheels L—$L^1$, $L^2$—$L^3$, constitutes the supporting wheels of the machine, they are preferably flanged; and they are preferably of greater diameter than the power-wheel D. Extending downwardly from each journal-arm J—$J^1$, pivoted respectively at $m$ and $m^1$, is a strong link M—$M^1$, as shown in Figs. 1, 2 and 4. The lower ends of the links M—$M^1$, are pivotally secured to the lower guide-rail F, at $f$—$f^1$, respectively, as best shown in Fig. 1. From a point adjacent to $f^1$, and extending to its end, as shown in the same figure, the guide-rail F, is preferably laminated for resilient flexibility. Directly above the brace-rod $A^5$, is another brace-rod $A^4$, and upon it is centrally pivoted a strong rocking-arm N of substantially the same length as the combined lengths of the journal-arms J—$J^1$, so that one end of the rocking-arm is above the end of the journal-box of the journal-arm J, and its other end above that of $J^1$, and a coil spring $j$, is interposed between the journal-arm J, and the rocking-arm at one end while a similar spring is interposed between $J^1$, and the other end of the rocking-arm. Suitable cups $n$—$n^1$ and $j^2$—$j^3$, are provided on the rocking-arm and the journal-arms J—$J^1$, to receive and position the springs $j$—$j^1$, all of which is clearly shown in Fig. 1, and further illustrated in Fig. 2 and Fig. 3.

Centrally located of the two sides of the frame A and of the bracket $A^2$, and resting thereupon in a spring cup $a^4$, is a third coil spring $e$, its upper end abutting the under side of the upper guide-rail E, in a suitably disposed spring cup $e^1$, secured to the guide-rail E, all of which is best shown in Fig. 1, and further illustrated in Fig. 4.

By means of the construction herein set forth, the load on the track-assembly is borne upon the twin-wheels L—$L^1$, $L^2$—$L^3$, the antifriction rollers I, serving merely to facilitate the travel of the track-chain G. In Fig. 1, it will be noted that the rollers marked I—I, immediately beneath the bearing-wheels $L^1$, $L^2$, do not contact with the under side of guide-rail F. This is also clearly shown in the section Fig. 2, by the space between the roller I, and the under side of guide-rail F. When traveling upon uneven ground, over a hummock, the wheels L—$L^1$, $L^2$—$L^3$, still bear the load and only such pressure and duty falls upon the rollers I, I, between the peripheries of the bearing-wheels as is due to the resilience of the guide-rail F, and this duty is distributed over all the intervening rollers I, with only such pressure as is desirable to ensure tractive contact of the tread shoes H—H, with the ground surface between the peripheries of the load-bearing-wheels L—$L^1$, $L^2$—$L^3$.

The independent pivotal mounting of each twin-wheel unit permits them to respond independently of each other; and the equalizer rocking-arm N, with the interposed springs $j$ and $j^1$, give resiliently flexible adjustment of the guide-rail F, to any ground unevenness while maintaining the track-chain G, in smooth undulations without the stresses and torsions due to buckling of the chain G, between load-bearing wheel peripheries.

The travel of the track-chain G, in its upper stretch, and around the oval of the guide-way is smooth, as each link is carried on its antifriction roller.

With the arrangement shown and described herein, though each track-assembly has in effect but two points of support, the wheel-base is as long as is customary in tracklayers having five or six truck-wheels. The absence of the ordinary chain-track idler-wheel makes the length of the track-assembly shorter (by the diameter of such idler-wheel) than the ordinary tracklayer tractor, with a corresponding saving of weight, cost and upkeep expense; which is one of the objects of this invention.

The construction herein described and illustrated, with the axes of B, K, $A^5$, $K^1$ and $A^6$, all located substantially in the same horizontal plane permits the load-bearing wheels to be of relatively large diameter and of greater diameter than that of the power-wheel D of normal size. This arrangement facilitates fast speed, and at the same time raises the points of lubrication and the power-wheel out of proximity to the dirt and dust of the ground. The oval guide-way not only tensions the track-chain but also furnishes a substantially continuous smooth track for the antifriction rollers on the chain. This arrangement makes available as a source of economy the high speed of the upper fold of the chain, heretofore detrimental, as its momentum and centrifugal action tend to lighten the pressure on the antifriction rollers and guide-way. These various constructions, arrangements and provisions facilitate high speed of chain-track and fast speed of advance in the thus constructed machine, which is the prime object of the invention.

In view of these radical and pioneer departures from present accepted practice and construction, I do not desire to be limited to the particular expression of my invention used herein for illustrative purposes, nor to be limited in any other way than in accord with a liberal interpretation and the reasonable purport of the claims which follow.

I claim:

1. A vehicle comprising a frame, a power-wheel journaled thereon, an endless-chain-track adapted to ground support, a support wheel travelable upon the ground run of the chain, an arm pivotedly connected to the frame on which the support wheel is journaled, the axes of the power-wheel and support wheel and pivotal connection being normally in substantially the same and their lowermost arcs in different horizontal planes.

2. A vehicle comprising a frame, a power-wheel journaled thereon, an endless-chain twin-track adapted to ground support, twin support-wheels travelable upon the ground run of the twin-track, an arm pivotally connected to the frame on which the twin support-wheels are journaled, the axes of the power-wheel and support-wheels and pivotal connection being normally in substantially the same horizontal plane.

3. A vehicle comprising a frame, a power-wheel journaled thereon, a guide-rail pivotally connected to the frame, an endless-chain-track trained around the power-wheel and guide-rail, twin support-wheels travelable upon the ground run of the chain, an arm pivotally connected to the frame on which the twin support-wheels are journaled, the axes of the power-wheel and support-wheels and the pivot of the journal arm being normally in substantially the same horizontal plane.

4. A vehicle comprising a frame, a power-wheel journaled thereon, a guide-rail formed of upper and lower curved members pivotally connected to the frame, an endless-chain track trained around the power-wheel and guide-rail, twin support-wheels travelable upon the ground run of the chain, an arm pivotally connected to the frame on which the twin support-wheels are journaled, the axes of the power-wheel and support-wheels and pivot of the journal arm being normally in substantially the same horizontal plane.

5. A vehicle comprising a frame, a power-wheel journaled thereon, a guide-rail formed of spring-controlled upper and lower curved members pivotally connected to the frame, an endless-chain twin-track trained around the power-wheel and guide-rail, spring-opposed support-wheels travelable upon the ground run of the chain, an arm pivotally connected to the frame on which the support-wheels are journaled, the axes of the power-wheel and support-wheels and pivot of the journal arm being normally in substantially the same horizontal plane.

6. A vehicle comprising a frame, an endless chain track with antifriction rollers journaled thereon, means adapted to maintain the upper and lower run of the track in the same vertical plane of travel, a support wheel travelable upon the ground run of the chain, an arm pivotally connected to the frame on which the wheel is journaled, a second support-wheel similarly journaled on a second arm similarly connected to the frame, and a guide-rail bridging the space between the peripheries of the support-wheels vertically movable therewith adjacent to the lower run of the track and coacting with the antifriction rollers on the chain to control its flexure.

7. A vehicle comprising a frame, an endless-chain track with antifriction rollers journaled thereon, means adapted to maintain the upper and lower run of the track in the same vertical plane of travel, an arm pivotally connected to the frame by one of its ends, a spring-opposed support-wheel at the other end of the arm travelable on the ground run of the chain, a second independently spring-opposed support wheel similarly journaled on a second arm similarly connected to the frame, a guide-rail bridging the space between the peripheries of the support-wheels vertically movable therewith adjacent to the lower run of the track coacting with the antifriction rollers on the chain to control its flexure.

8. A vehicle comprising a frame, an endless-chain track with antifriction rollers journaled thereon, means adapted to maintain the upper and lower run of the track in the same vertical plane of travel, an arm pivotally connected to the frame by one of its ends, a spring-opposed support-wheel journaled at the other end of the arm travelable on the ground run of the chain, a second independently spring-opposed support wheel similarly journaled on a second arm similarly connected to the frame, a guide-rail bridging the space between the peripheries of the support-wheels vertically movable therewith adjacent to the lower run of the track coacting with the antifriction rollers on the chain to control its flexure, and a rock-arm pivoted to the frame above the journal arms in spring-controlled abutment therewith.

9. In a tracklayer tractor track-assembly, a frame, an endless-chain twin-track, two sets of twin support-wheels longitudinally spaced apart to constitute the wheel-base of the assembly, a separate radially movable journal-arm for each set of twin support-wheels pivoted on the frame intermediate of the support-wheels.

10. In a tracklayer tractor track assembly, a frame, an endless-chain twin-track, two sets of twin support-wheels longitudinally spaced apart to constitute the wheel-base of the assembly, a separate radially movable journal-arm for each set of twin support-wheels pivoted on the frame in substantially the same plane as the normal horizontal diameters of the support-wheels.

11. In a tracklayer vehicle track-assembly, a frame, an endless-chain twin-track, two sets of twin support-wheels longitudinally spaced apart to constitute the wheel-base of the assembly, a separate radially movable spring opposed journal-arm for each set of twin support-wheels pivoted on the frame intermediate of the support-wheels.

12. In a tracklayer vehicle a track-assembly, a frame therefor, an endless-chain twin-track, two sets of twin support-wheels longitudinally spaced apart to constitute the wheel-base of the assembly, a separate radially movable spring-opposed journal-arm for each set of twin support-wheels pivoted on the frame in substantially the same plane as the normal horizontal diameters of the support-wheels.

13. In a tracklayer vehicle track-assembly, a frame for the assembly, an endless-chain twin-track, two sets of twin support-wheels longitudinally spaced apart to constitute the wheel-base of the assembly, a separate radially movable journal-arm for each set of the twin support-wheels pivoted on the frame intermediate of the support-wheels, and a guide-rail bridging the space between the peripheries of the support-wheels vertically movable therewith adjacent to the lower run of the track coacting therewith to control its flexure.

14. In a tracklayer vehicle track-assembly, a frame for the assembly, an endless-chain twin-track with antifriction rollers journaled thereon, two sets of twin support-wheels longitudinally spaced apart to constitute the wheel-base of the assembly, a separate radially movable journal-arm for each set of twin support-wheels pivoted on the frame intermediate of the support-wheels, and a guide-rail bridging the space between the peripheries of the support-wheels vertically movable therewith adjacent to the lower run of the track coacting with the antifriction rollers on the chain to control its flexure.

15. In a tracklayer vehicle track-assembly, a frame for the assembly, an endless-chain twin-track, two sets of twin support-wheels longitudinally spaced apart to constitute the wheel-base of the assembly, a separate radially movable journal-arm for each set of twin support-wheels pivoted on the frame in substantially the same plane as the normal horizontal diameters of the support-wheels, and a guide-rail bridging the space between the peripheries of the support-wheels vertically movable therewith adjacent to the lower run of the track coacting with the antifriction rollers on the chain to control its flexure.

16. In a tracklayer vehicle track-assembly, a frame for the assembly, an endless-chain twin-track, two sets of twin support-wheels longitudinally spaced apart to constitute the wheel-base of the assembly, a separate radially movable spring opposed journal-arm for each set of twin support-wheels pivoted on the frame intermediate of the support-wheels, and a guide-rail bridging the space between the peripheries of the support-wheels vertically movable therewith adjacent to the lower run of the track coacting with the antifriction rollers on the chain to control its flexure.

17. In a tracklayer vehicle track-assembly, a frame for the assembly, an endless-chain twin-track, two sets of twin support-wheels longitudinally spaced apart to constitute the wheel-base of the assembly, a separate radially movable spring-opposed journal-arm for each set of twin support-wheels pivoted on the frame in substantially the same plane as the normal horizontal diameters of the support-wheels, and a guide-rail bridging the space between the peripheries of the support-wheels vertically movable therewith adjacent to the lower run of the track coacting with the antifriction rollers on the chain to control its flexure.

18. In a tracklayer vehicle track-assembly, a frame for the assembly, an endless-chain twin-track, two sets of twin support-wheels longitudinally spaced apart to constitute the wheel-base of the assembly, a separate radially movable journal-arm for each set of twin support-wheels, a rocker-arm pivoted to the frame, and springs interposed between each journal-arm and rocker-arm to independently cushion the load on each twin support-wheel.

19. In a device of the character described a load equalizer comprising a frame for the device, two unit support-wheels each unit wheel journaled on a separate radial vertically movable arm pivoted on the frame intermediate of the unit wheels, and a rock-arm pivoted on the frame adapted to resiliently oppose the vertical movement of the support wheels.

20. In a device of the character described a load equalizer comprising a frame for the device, two unit support-wheels each unit wheel journaled on a separate radial vertically movable arm pivoted on the frame in substantially the same plane as the normal horizontal diameters of the support wheels, and a rock-arm pivoted on the frame adapted to resiliently oppose the vertical movement of the support wheels.

21. In a vehicle, a frame, an endless chain-track with a power-wheel in one end bight and support-wheels of greater diameter travelable upon its ground run, an arm pivotally connected to the frame on which arm the support-wheels are journaled the axes of the power-wheel and support-wheels being normally in substantially the same horizontal plane.

22. In a vehicle, a frame, an endless chain-track with a power-wheel in one end bight and support-wheels of greater diameter travelable upon its ground run, a spring-opposed arm pivotally connected to the frame on which each support wheel is journaled the axes of the power-wheel and support-wheels being normally in substantially the same horizontal plane.

WILLIAM H. SMYTH.